Jan. 3, 1967     D. W. BRADY ETAL     3,295,299
AGRICULTURAL MACHINE
Filed Sept. 11, 1964     3 Sheets-Sheet 1
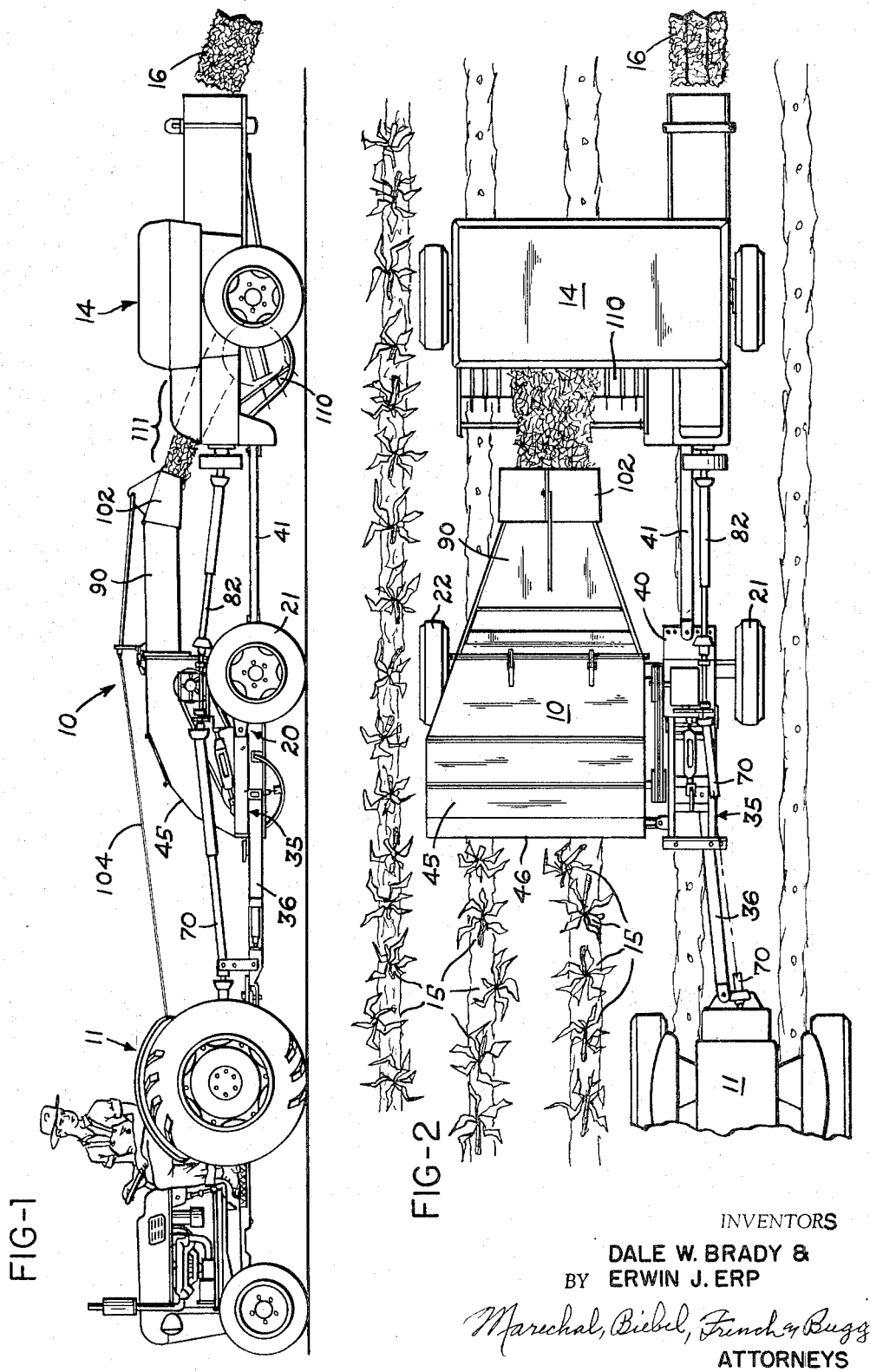
INVENTORS
DALE W. BRADY &
BY ERWIN J. ERP
Marechal, Biebel, French & Bugg
ATTORNEYS

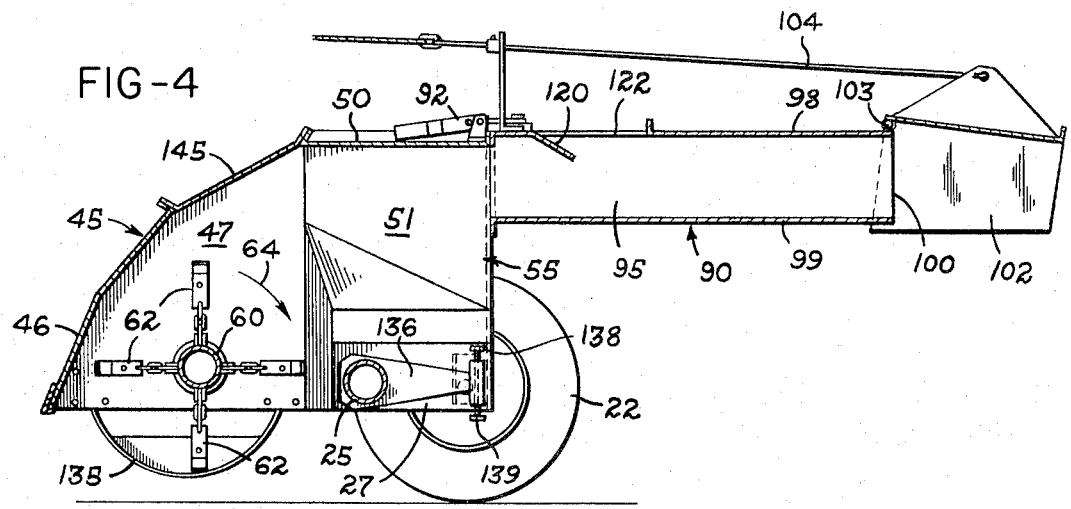
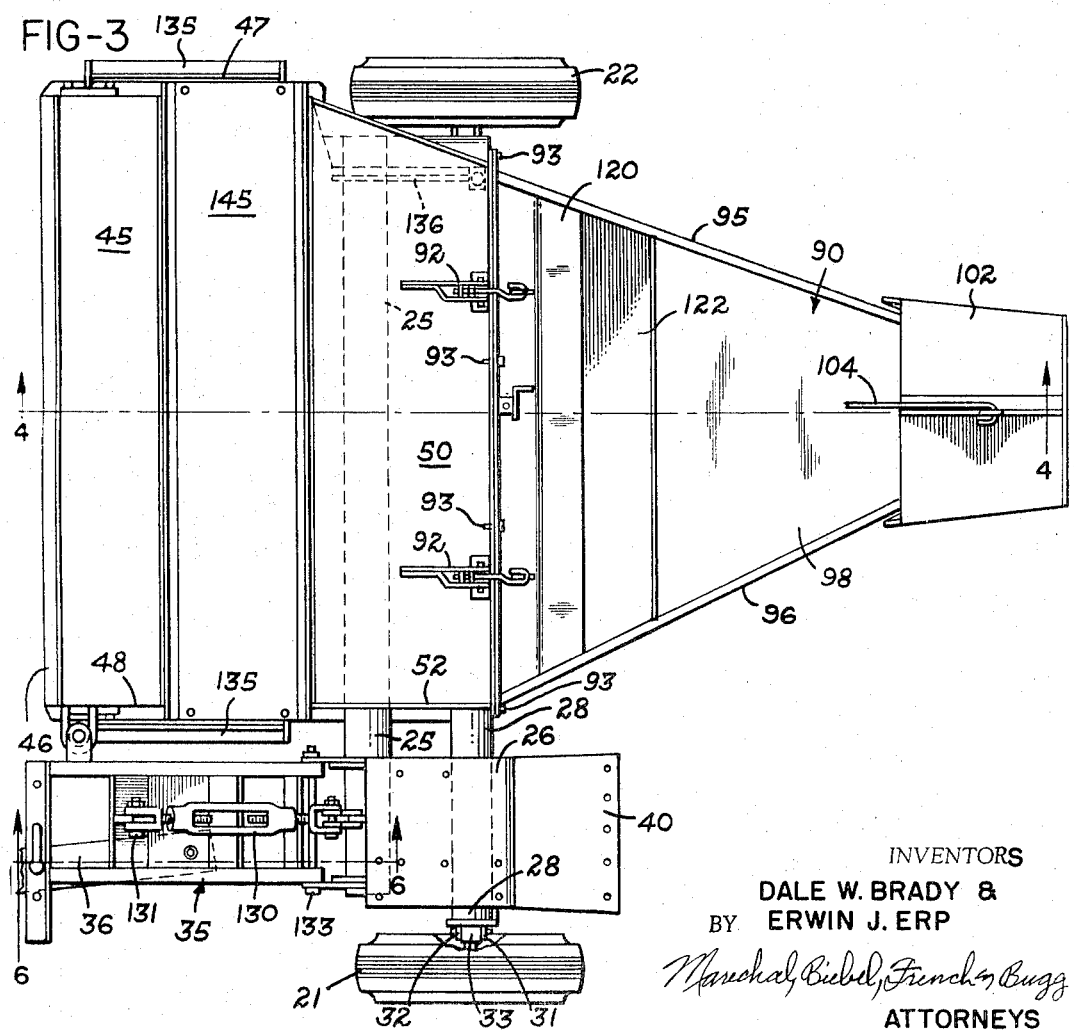
INVENTORS
DALE W. BRADY &
BY ERWIN J. ERP
ATTORNEYS

Jan. 3, 1967 D. W. BRADY ETAL 3,295,299
AGRICULTURAL MACHINE
Filed Sept. 11, 1964 3 Sheets-Sheet 3
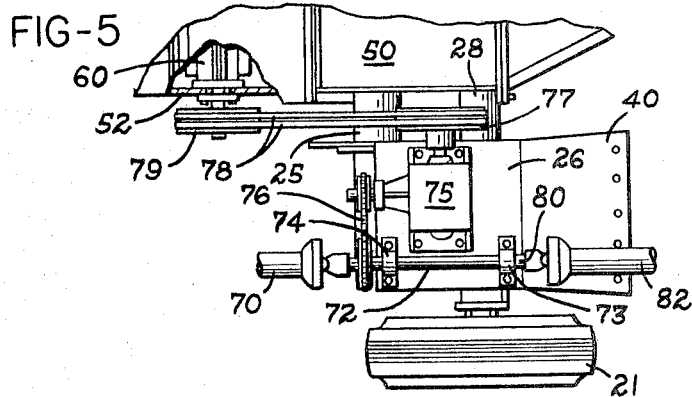
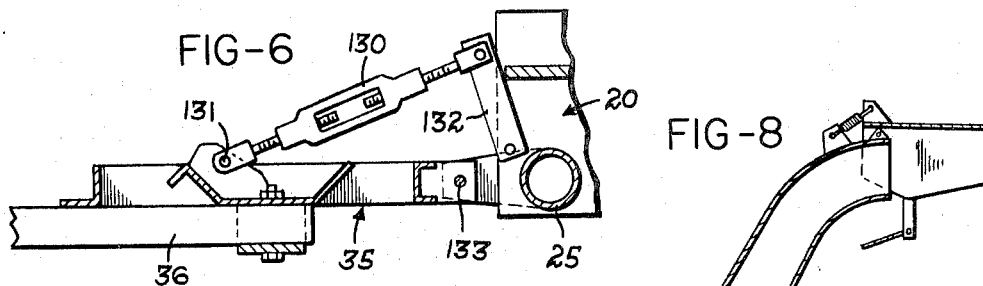
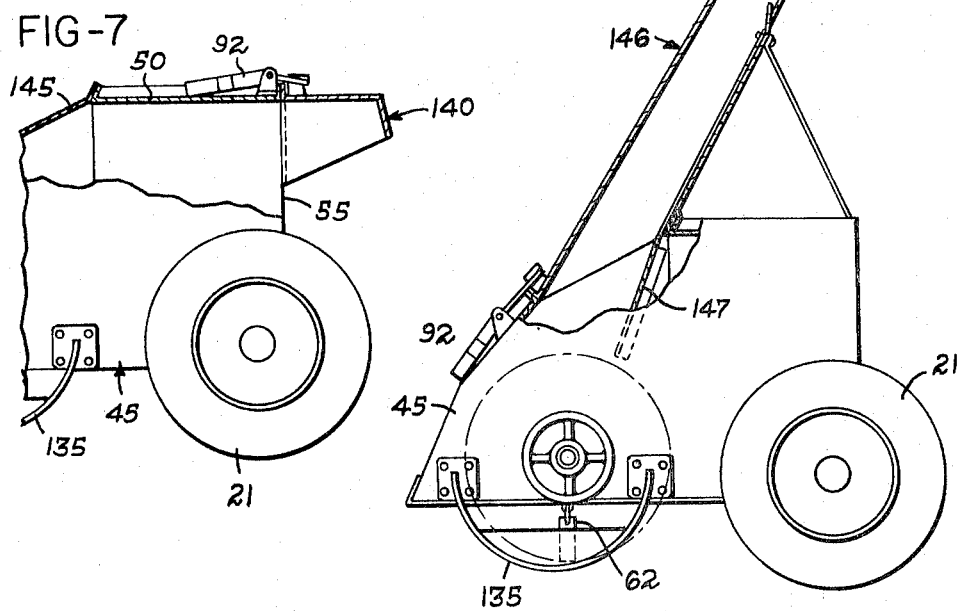
INVENTORS
DALE W. BRADY &
BY ERWIN J. ERP
Marechal, Biebel, French & Bugg
ATTORNEYS

United States Patent Office 3,295,299
Patented Jan. 3, 1967

3,295,299
AGRICULTURAL MACHINE
Dale W. Brady, Altoona, and Erwin J. Erp, Des Moines, Iowa, assignors to Brady Manufacturing Corporation, Des Moines, Iowa, a corporation of Ohio
Filed Sept. 11, 1964, Ser. No. 395,815
7 Claims. (Cl. 56—24)

This invention pertains to agricultural harvesting machines and more particularly to a chopping or shredding machine for chopping corn stalks, straw, hay and the like and for the direct operation of a baler.

It is well known that chopped corn stalks provide a superior bedding material for livestock due to the ability of the chopped corn stalks to absorb moisture substantially in excess of the moisture absorbing ability of straw. However, the use of chopped corn stalks for bedding has not come into general use primarily due to the difficulty in making and collecting the same from a field of corn stalks as compared to the cost and availability of hay. However, various attempts have been made to obtain chopped corn stalks for bedding, and these attempts have included going into the field of corn stalks after the corn has been picked, chopping the same with available field choppers, and then windrowing the chopped corn stalks so that the same could be picked up by a baler. A primary difficulty with this was that the windrowing operation was customarily performed by a side delivery rake which was designed for use with hay and straw and which frequently suffered damage when used in a corn field. Either the rake was set rather high in which case it did a poor job of raking the chopped corn stalks, or the rake was set lower in which case the raking tines were often damaged on the corn hills. In any event, a substantial amount of dirt would be raked with the chopped corn stalks.

It was then necessary to hook up the baler and take it into the cornfield. Again, if the baler pickup tines were set high above the ground, the baler would perform efficiently in gathering the chopped and windrowed corn stalks. However, if the baler pickup tines were lowered it often resulted not only in damage to the baler pickup reel but also in gathering and baling a substantial amount of deleterious and unwanted field material, such as rocks, dirt and the like.

It has also been suggested to attach a flail type chopper directly to a baler in the place of the baler's usual pickup reel. This arrangement has the disadvantage of requiring substantial disassembly of the baler for the attachment of the chopping knives, and the further disadvantage that all of the material chopped by the knives is fed into the interior of the baler and is baled together with the chopped corn stalks.

A primary object of the present invention is to provide an agricultural machine which eliminates the above problems and which provides for the direct chopping and baling of corn stalks in one operation without damage to the baler and with an absolute minimum of deleterious material in the chopped corn stalk bales. The apparatus of this invention accordingly makes possible the baling of clean and highly useful chopped corn stalks for use for bedding material at a price to the farmer which is often substantially less than baled straw. The invention provides for the use of stalks which would otherwise be left in the field, and then may be used as a chopper for chopping the remaining stalks for return as mulch to the soil.

A further important object of this invention is the provision of an agricultural machine forming a direct attachment for a conventional baler and which also provides for the driving of the baler mechanism from a conventional tractor PTO drive.

A further object of this invention is the provision of an agricultural machine which provides for the direct operation of a conventional baler and which feeds chopped crop semi-dry material, such as corn stalks, straw, and the like directly into a baler pickup reel and which provides for the separation of heavier deleterious material from the chopped crop prior to entering the baler.

A still further object of this invention is the provision of a chopper which is particularly adapted to chop corn stalks and the like for direct baling, which provides for the direct operation of a baler therefrom, and which is further adapted for chopping the corn stalks and leaving the same in the field, or for blowing the same into a wagon. The machine of this invention is further adapted, by the mounting of a shield, for conversion into a hay cutter and conditioner.

It is accordingly an important object of this invention to provide a versatile chopping machine which is not limited to any one particular use but which may be used to operate a baler, or as a more conventional chopper or hay cutter and conditioner, and which is provided with quickly and easily detachable ducts and hoods for such operations.

An important advantage of this invention is that it permits the use of a baler in chopping corn stalks while the baler pickup reel is operated at a height well above the level of the ground and free of damaging interference with the rough terrain of a corn field.

These and other objects and advantages of the invention will be apparent from the following description, the accompanying drawings and the appended claims.

In the drawings:

FIG. 1 is an elevational view of an agricultural machine constructed according to this invention being shown as connected to a tractor and having a baler connected thereto providing for the direct operation of the baler;

FIG. 2 is a plan view of the machine of FIG. 1, showing only a portion of the tractor, and looking down upon the machine and the attached driven baler in a typical cornfield;

FIG. 3 is an enlarged plan view of the chopping machine with the power takeoff and drive mechanism removed;

FIG. 4 is a longitudinal vertical section taken generally along the line 4—4 of FIG. 3;

FIG. 5 is a fragmentary plan view, partially broken away, of the lower portion of FIG. 3, showing the power take off mechanism;

FIG. 6 is a fragmentary enlarged sectional view taken generally along the line 6—6 of FIG. 3, showing the height adjusting mechanism;

FIG. 7 is a somewhat diagrammatic illustration showing a hay conditioner fluffer shield mounted in place of the baler duct; and FIG. 8 is a further somewhat diagrammatic sectional view showing an upward delivery wagon filling chute attached through an upper opening in the machine for filling farm wagons with green chopped chop material.

Referring to the figures of the drawings which represent a preferred embodiment of this invention, an elevational view of a machine constructed according to this invention is shown at 10 in FIG. 1. The machine 10 is shown in FIG. 1 as being connected to a tractor 11 and as having a baler 14 connected thereto for bailing corn stalks 15 into bales 16. As shown in FIGS. 1 and 2, the machine 10 is formed with a ground traversing frame indicated generally at 20 which extends transversely to the line of travel and which is rotatably mounted on transversely spaced wheels 21 and 22, as shown in FIG. 2. The frame 20, as best shown in FIGS. 3 and 4, includes a transversely aligned support tube 25 which connects, at the left hand side, to a power takeoff support frame and stand 26 and at the right hand side to a rigid wall plate 27. The frame 20 further includes a cylindrical stub shaft 28 spaced from the tube 25 and forming a rigid support for the stand 26.

Means for rotatably supporting the pair of ground engaging wheels 21 and 22 includes pairs of spaced flanges 31 and 32 extending outwardly from the frame at opposite sides of the machine and within and between which spindle blocks 33 are mounted in vertical predetermined position. The spindle blocks 33, in turn, support the wheels 21 and 22 for rotation.

The frame 20 further includes a hitch assembly which is indicated generally at 35 in FIGS. 1 and 2 from which a forwardly extending draft bar 36 is mounted for direct connection to the draw bar of the tractor 11. The frame 20, at the platform 26, also includes a baler hitch 40 to which the baler draft bar 41 may be attached for ground traversing movement of the baler 14 rearwardly of, and in spaced relation to, the machine 10 but generally in line therewith.

The machine 10 is formed with a generally semi-cylindrical hood 45, as shown in section in FIG. 4. The hood 45 is received on the frame 20 transverse to the line of travel and is closed at the front portion 46 and at the sides 47 and 48. The hood 45 opens downwardly and has a top 50 which extends rearwardly. As shown in FIG. 4, the rearwardly extending hood portion 50 is closed at the sides by an inwardly angled side plate 51 on the right hand side of the machine and a straight side plate 52 on the left hand side of the machine. The hood 45 at the horizontal top plate 50 forms a rearwardly facing opening thereacross which is indicated generally at 55 in FIG. 4. The hood 45 is accordingly closed at the front, the sides and the top but is open across the bottom and at the back.

A cylindrical knife shaft 60 is rotatably received within the hood 45 extending thereacross adjacent the forward portion 46 thereof and supports a plurality of extendable and laterally displaced knife assemblies 62. The shaft 60 and the knife assembly 62 may be constructed according to the patent to Brady No. 2,902,813, issued September 8, 1959, and assigned to the same assignee as this application, and operates when rotated clockwise in the direction of the arrow 64 to engage a crop, chop and shred the same, and to direct the chopped and shredded crop upwardly within the hood 45 adjacent the inside surface of the top 50 for discharge through the rear opening 55.

Means for driving the knife shaft 60 comprises a power take off shaft 70 (FIGS. 1 and 5) which is connectable at its forward end to the PTO drive of the tractor and which, at its rearward end, is connected in driving relation to a stub shaft 72. The shaft 72 is supported on the upper platform surface of the stand 26 for rotation on suitable bearings 73 and 74. The forward end of the shaft 72 is directly connected to a 90° drive gear box 75 through a suitable sprocket and chain drive 76. The gear box 75 is connected in driving relation to the knife shaft 60 by means of dual pulleys 77 on the gear box and belts 78 driving suitable dual pulleys 79 connected to an extended end of the knife shaft 60. The stub shaft 72 and the gear box 75 form the means by which the knife shaft 60 and the flail knives 62 are driven from the PTO connection of a tractor.

The machine of this invention further includes means for applying the PTO drive of the tractor directly to the baler 14. For this purpose, the stub shaft 72 is extended rearwardly at 80 and provides a PTO connection means on the frame 20 for a baler drive shaft 82. By this arrangement, the baler 14 is driven through the machine 10 simultaneously with the driving of the knife shaft 60.

Means for directing the chopped crop material from the hood 45 to the baler includes a chute or duct 90. The duct 90 is generally rectangular in cross section and has a width at its forward end which corresponds to the transverse width of the rearward opening 55 of the hood 45. The duct 90 is preferably releasably attached to the hood 45 by a plurality of over-center latches 92, a pair of which are shown in plan view in FIG. 3. Additionally, the duct 90 may be provided with locating pins such as shown at 93 in FIG. 3 for correct positioning and alignment thereof.

The duct 90 is open at its forward end to receive chopped material from the interior of the hood 45. However, the depth or vertical extent of the duct 90 is substantially less than the corresponding vertical extent of the hood 45 at the opening 55 and, as shown in FIG. 4, extends across the top of the plate 50 but extends vertically less than one-half of the vertical height of the hood 45 at the rear opening. Accordingly, when the duct 90 is in place there is defined a portion of the opening 55 therebeneath through which heavy deleterious objects may be discharged before they become entrained within the duct 90.

The duct 90 is formed generally horizontal to the ground with converging sides 95 and 96 while remaining of substantially constant depth throughout the length thereof. The duct 90 is further formed with a top 98 and a bottom 99, which, together with the sides, define a rearwardly facing outlet opening 100 which is of smaller cross sectional area than the inlet opening at its attachment to the hood 45. A suitable deflector 102 formed with three sides and a top may be pivotally connected at a hinge pin 103 to the top 98 of the duct 90 and controlled through a suitable pull rod 104 by the tractor operator for control of the discharge angle of chopped material through the opening 100.

The duct 90 is terminated at the opening 100 substantially forwardly and above the baler pickup reel 110, as indicated in FIGS. 1 and 2. Accordingly, an open air space 111 is provided within which the chopped material from the duct 90 flows rearwardly and downwardly into the pickup reel 110. Preferably, the chopped material is directed above the median line of the pickup reel and carried by the baler mechanism directly into the baling mechanism of the baler. This arrangement has two distinct advantages. First, the space 111 provides for the gravitational separation of foreign or deleterious heavy objects which may have been entrained with the chopped crop material and permits them to fall harmlessly on the ground in front of the baler pickup reel while the lighter chopped chop material is directed into the pickup reel. Second, it permits the baler pickup reel to be operated at its maximum height to prevent both contact with the ground and with gravitationally separated objects as described above. The latter is particularly important when operating in a corn field.

The duct 90 is preferably provided with deflector means including an inwardly-bent, transversely-oriented tab 120 in the top 98 extending inwardly a short distance into the interior of the duct. The tab 120 forms the leading edge of a transverse opening 122 which is formed across the top of the duct 90. The tab 120 and the opening 122 provide the means by which the chopped material flowing through the duct is prevented from following the upper duct surface and is somewhat interrupted and broken in its flow more nearly toward the center or bottom surface of the duct. This arrangement has been found to be of advantage since material hugging the top of the duct tends to be more rapidly decelerated due to frictional contact with the duct surface and has a tendency to dribble out the back opening 100 with impaired velocity. This provision of the deflector 120 and the air opening 122 immediately rearwardly thereof results in the full utilization of the cross sectional area of the duct 90 and prevents excessive contact by the chopped material with the top of the duct while the chopped material remains entrained with the air stream and is effectively discharged through the rear opening 100.

Means for adjusting the hood 45 for varying chopping conditions above the ground comprises the mechanism shown in FIG. 6 which includes a turnbuckle 130 which has one end connected through a pin 131 to the hitch assembly 35 and the opposite end connected to a plate 132 which is a rigid part of the frame 20. The hitch assembly 35 is, in turn, pivotally attached to the frame 20 by a cross pin 133, FIGS. 6 and 3. Extending the turnbuckle 130 results in the raising of the forward portion 46 of the hood 45 above the ground, while contracting the turn buckle 130 has the converse effect. Preferably, the opposite sides of the hood 45 are provided with some semi-cylindrical skid bars 135 (FIG. 4) which serve to prevent scalping by the knife assemblies 62.

The invention further includes means for adjusting or leveling the hood 45 in relation to the ground, and comprises an arm 136 on the right hand side of the machine which has one end rigidly connected to the tube 25 adjacent the side plate 27. The free end of the arm 136 is adjustably received within a bracket and is held between opposite threaded adjusting bolts 138 and 139. The bolts 138 and 139 may be rotated to cause the right hand side of the hood 45 to be raised or lowered in relation to the left hand side, and accordingly this mechanism provides the means by which the machine may be leveled initially, and after it has been in use.

The apparatus of this invention may be used for straight chopping and discharge of the corn stalks or other crop material when baling is not desired, merely by the removal of the duct 90 which permits discharge of the chopped crop material through the full width of the opening 55 onto the ground. The machine is readily convertible to hay cutter and conditioning by the attachment of a fluffer shield 140 in lieu of the duct 90, as shown in FIG. 7. The machine is further convertible to a rear-delivery chopper for filling a farm wagon or the like with chopped green material by the removal of a hood plate 145, which forms a portion of the hood 45, and by the erection in its place of a suitable upwardly and rearwardly discharging conduit 146, as shown in FIG. 8. The conduit 146 has an inwardly extending back wall 147 which terminates in closely spaced relation to the radius of action of the knife assemblies 62. With the conduit 146 in place it is not necessary to block off the rear opening 55 since the chopped material will be directed into the conduit 146 directly from the hood 45 for discharge rearwardly of the machine.

In the operation of this invention, the duct 90 is mounted in place and secured by the latch mechanism 92. The draft bar 36 is then connected to follow in laterally offset relation behind the tractor and the power take off shaft 70 may be connected. The baler 14 may then be brought in place and connected, substantially as shown in FIGS. 1 and 2, to the baler hitch 40 to trail in offset spaced relation directly behind the machine 10 and the rearwardly extending duct 90. As noted above, the duct 90 is formed of a length sufficiently to define an open air space 111 between the end of the deflector shield 102 and the baler pickup reel 110. The power take off shaft 82 of the baler is then connected to the PTO drive portion 80 of the chopper shaft 72 and provides for the direct drive of the baler mechanism from the tractor 11. On self-powered balers, this connection is, of course, omitted.

As previously described, the apparatus of this invention operates from a conventional tractor and with a conventional baler for chopping corn stalks or other harvestable semi-dried crop material and for the direct feeding of such material into the baler. For this purpose, the baler pickup reel is preferably set to a maximum height condition, particularly when it is to be used in a cornfield. The chopped crop material is propelled by the rotating knife assemblies 62 directly into the duct 90, and are rotated at a sufficient speed to propel such chopped material entrained in a stream of air which is created by the centrifugal fan-like action of the rotating knife assemblies. Accordingly, no auxiliary blower or auger is used.

The deflector 102 is preferably adjusted to direct the chopped crop material directly into the baler at or above the upper half of the baler pickup reel. However, the position of the deflector 102 may be varied in accordance with the baler's characteristics and may be raised or lowered to obtain the best baling results. Also, if desired, the deflector 102 may be adjusted to direct the chopped material downwardly in front of the baler and the baler may then pick the material up off the ground.

Much of the foreign objects which may be struck by the rotating knives, will fall to the ground harmlessly without entering the duct 90. Some of these may be discharged through the lower portion of the opening 55. Accordingly, this opening may be considered as a first separator means so that the lighter chopped crop material, such as the chopped corn stalks, are directed into the duct 90. However, occasionally a heavy foreign object will enter the duct 90 impelled by the velocity imparted by the knife assemblies 62. However, most of such objects are effectively separated by gravity at the free air space 111 prior to entering the baler, and this may be considered as a further means for separating heavier deleterious objects from the desired chopped crop material. Accordingly, the material which is baled will be of a high quality, substantially free of foreign objects.

The apparatus of this invention is further versatile in that the same equipment may be used in a field following a combine to cut straw and operate a baler to bale straw in a single operation. When used in this manner, the usual separate cutting and raking operations are eliminated. Also, the machine is useful for cutting and baling soy bean stalks following the combine, for bedding material.

When the desired amount of crop material has been baled, the baler 14 may be disconnected and the duct 90 removed, and the machine 10 may then continue to be used to chop the remaining crop material which is discharged through the opening 55 and returned evenly to the surface of the ground, as a mulch and soil conditioner.

As has been described above, the machine 10 may be used at other times as a hay cutter and conditioner, or as a chopper for cutting and chopping green forage material. Also, the hood 90 may be used without the baler for forming windrows of crop material, in which case the machine combines the customary cutting and windrowing operations.

It will therefore be seen that this invention provides a versatile agricultural machine, which chops, windrows, and operates a baler in a single operation. This machine accordingly performs what has heretofore been considered as three separate operations and provides clean bales of chopped crops.

While the form of separation herein described constitutes a preferred embodiment of the invention, it is to be understood that the invention is not limited to this precise form of apparatus, and that changes may be made therein without departing from the scope of the invention which is defined in the appended claims.

What is claimed is:

1. An agricultural machine for chopping corn stalks or other harvestable semi-dried crops and for the direct feeding thereof into a baler and for the operation of such baler to receive chopped crop material comprising a frame, means mounting said frame for ground traversing movement, a generally semi-cylindrical hood received on said frame and extending transversely to the line of travel thereof, said hood having a closed front portion and top and being open at the bottom thereof and at the rear thereof, a knife shaft, means mounting said shaft for rotation in said hood transverse to said line of travel adjacent the front of said hood and extending across the width thereof, a plurality of crop engaging knives pivotally mounted on said shaft for engagement with crop for chopping said crop and for directing said chopped material upwardly and rearwardly within said hood, power take off means on said frame adapted for connection to the PTO drive of a tractor and having means connected to drive said shaft, a duct extending transversely across said hood at said top to receive said chopped material therefrom through said rear opening, means in said duct at the top thereof forming a transverse deflector tab extending inwardly into said duct and an opening formed rearwardly of said deflector tab for interrupting the tendency of chopped material to flow along the top of said duct providing utilization of the full cross-section thereof, said duct being extended rearwardly generally along the line of travel of said machine and terminating in a spout adapted to discharge said chopped material therethrough, means on said frame for attaching a baler thereto for ground traversing movement with said frame, power take off means on said frame in driven relation to said PTO drive shaft and having means thereon engageable with the drive shaft of such baler for applying power from such tractor to such baler, said duct at said discharger spout having a rearwardly extending length in relation to such baler for discharging said chopped material rearwardly through an open air space directly into the baler pickup reel providing for the gravitational separation of deleterious heavy objects while permitting such baler pickup reel to be operated above ground level.

2. An agricultural machine for chopping corn stalks or other harvestable semi-dried crops and for the direct feeding thereof into a baler and for the operation of such baler to receive chopped crop material comprising a frame, means mounting said frame for ground traversing movement, a generally semi-cylindrical hood received on said frame and extending transversely to the line of travel thereof, said hood having a closed front portion and top and being open at the bottom thereof and at the rear thereof, a knife shaft, means mounting said shaft for rotation in said hood transverse to said line of travel adjacent the front of said hood and extending across the width thereof, a plurality of crop engaging knives pivotally mounted on said shaft for engagement with crop for chopping said crop and for directing said chopped material upwardly and rearwardly within said hood, power take off means on said frame adapted for connection to the PTO drive of a tractor and having means connected to drive said shaft, a generally horizontally positioned duct extending transversely across said hood at said top to receive said chopped material therefrom and having a depth less than the height of said hood rear opening partially closing said opening leaving a first space through which heavy deleterious objects may be discharged without entering said duct, said duct being extended rearwardly generally along the line of travel of said machine and terminating in a spout adapted to discharge said chopped material therethrough, means on said frame for attaching a baler thereto for ground traversing movement with said frame, power take off means on said frame in driven relation to said PTO drive shaft and having means thereon engageable with the drive shaft of such baler for applying power from such tractor to such baler, said duct at said discharge spout having a rearwardly extending length in relation to such baler for discharging said chopped material rearwardly through an open air space directly into the baler pickup reel providing a second space for the gravitational separation of deleterious heavy objects while permitting such baler pickup reel to be operated above ground level.

3. A device for harvesting chopped corn stalk bedding and for operating a baler in a corn field for baling such chopped stalks and for separating deleterious material from said chopped stalks prior to baling comprising a frame, means mounting said frame for ground traversing movement by a tractor, said frame having a power take off shaft thereon connecting with the PTO drive of such tractor, a transverse hood mounted on said frame and formed with a closed forward portion and top and having means forming downwardly and rearwardly facing openings, a knife shaft rotatably received in said hood adjacent said forward portion and having a plurality of knives thereon engageable with corn stalks as said frame is traversed over a corn field, drive means on said frame connecting said power take off shaft to rotate said knife shaft, a generally rearwardly extending duct secured to said hood adjacent the top thereof and extending substantially across the width of said hood at said rearwardly facing hood opening for receiving chopped corn stalks from said hood, said duct having a depth which is less than the vertical height of said rearward opening of said hood leaving an open space between the bottom of said duct and the bottom of said hood through which heavy particles thrown up by the knives may discharge without entering said hood, said duct having means forming an outlet opening for discharge of chopped corn stalks rearwardly of said duct, baler drive shaft means rotatably mounted on said frame and having one end connected in driven relation to said power take off shaft and having a rearwardly exposed portion forming a baler PTO drive for diect connection to such baler, means on said frame forming a baler hitch for connection to the draw bar of such baler with the baler's pickup reel being positioned rearwardly of and below said duct outlet opening, the length of said duct being proportioned to define a free air space between said duct outlet opening and the baler pickup reel for the graviational separation of heavier deleterious objects entrained with the chopped corn stalks.

4. A device for forming harvesting corn stalks bedding and for operating a baler in a corn field for baling such chopped stalks and for separating deleterious material from said stalks prior to baling comprising a frame adapted to be connected for ground traversing movement by a tractor, said frame having a power take off shaft thereon adapted for connection to the PTO drive of such tractor, a transverse semi-cylindrical hood mounted on said frame closed at the front sides and top and being open at the bottom and at the rear thereof, a knife shaft rotatably received in said hood adjacent and having a plurality of knives thereon engageable with corn stalks as said frame is traversed over a corn field, drive means connecting said power take off shaft to rotate said knife shaft, a generally rearwardly extending duct secured to said hood and extending substantially across the width of said joining hood at the top and sides thereof to receive chopped corn stalks therefrom, said duct having a depth which is less than the vertical height of the rearward opening of said hood leaving an open space between the bottom of said duct and the bottom of said hood through which heavy particles picked up by the knives may discharge without entering said hood, said duct being formed with a substantially narrower outlet opening than the width thereof at said hood with said opening being positioned substantially rearwardly of said hood and opening rearwardly thereof, a power take off feed through shaft rotatably mounted on said frame and having one end connected in driven relation to said power take off shaft and having a rearwardly exposed portion forming a baler PTO drive for direct connection to such baler, means on said frame forming a baler hitch for connection to the draw bar of such baler with the baler's pickup reel positioned rearwardly of said duct outlet, the length of said duct being proportioned to define a free air space between said duct outlet and the baler pickup reel of sufficient extent to provide for the gravitational separation of heavier deleterious objects entrained with the chopped corn stalks before they strike the baler pickup reel.

5. An improved agricultural machine for chopping corn stalks or other harvestable crops and adapted to feed the chopped material directly into a baler, comprising a frame, means supporting said frame for ground traversing movement, a hood received on said frame and extending transversely to the line of travel thereof, said hood including means defining a bottom opening and a rear opening, chopping knife means mounted for rotation within said hood on an axis transverse to the line of travel and adapted to engage the crop through said bottom opening for chopping the same and for directing the chopped crop material upwardly and rearwardly through said rear opening, drive means mounted on said frame and adapted to be connected to the PTO drive of a tractor for rotating said knife means, a rearwardly extending duct mounted on said frame and adapted to receive the chopped material thrown by said knife means through said rear opening, hitch means mounted on said frame for attaching and towing a baler behind said frame so that the pickup reel of the baler is disposed behind said chopping knife means, said duct including means defining a rear discharge opening through which the chopped material is directed rearwardly and downwardly directly into the pickup reel of the baler, and means in said duct defining an air opening in the top portion of said duct and a deflector tab extending into said duct forwardly of said air opening for interrupting the tendency of chopped material to flow along the top of said duct and reduce the friction between the chopped material and said duct.

6. A machine as defined in claim 5 including means for quickly removing said duct from said hood, and adjustable deflector means connected to said duct adjacent said discharge opening for precisely directing the chopped material into the baler pickup reel so that the reel can be positioned substantially above the ground to avoid engaging foreign objects on the ground.

7. Agricultural apparatus for chopping corn stalks or other harvestable crops and for immediately baling the chopped crop material, comprising a chopper including a frame and wheel means supporting said frame for ground traversing movement, a hood received on said frame and extending transversely to the line of travel thereof, said hood having means defining a bottom opening, a flail shaft, means mounting said shaft for rotation within said hood transverse to said line of travel and extending across the width thereof, a plurality of crop-engaging flails pivotally mounted on said shaft and proportioned to engage the crop through said bottom opening for chopping the same and for directing the chopped crop material upwardly and rearwardly within said hood, drive shaft means on said frame adapted to be connected to the PTO drive of a tractor for driving said flail shaft, a baler including a pickup reel and wheel means for supporting the same, offset hitch means on said frame and connected to said baler for towing said baler behind said frame so that said pickup reel is disposed substantially behind said hood, duct means supported on said chopper frame to receive such chopped crop material and having a rear discharge opening positioned substantially forwardly of said pickup reel for discharging the chopped chop material rearwardly through an open air space directly into said pickup reel to provide for the gravitational separation of heavy objects entrained with such material while permitting said baler pickup reel to be operated above ground level.

References Cited by the Examiner
UNITED STATES PATENTS

| 2,756,554 | 7/1956 | Diehl et al. | 56—23 X |
| 2,843,989 | 7/1958 | McClellan | 56—24 X |
| 3,035,393 | 5/1962 | Mathews | 56—24 X |
| 3,092,946 | 6/1963 | Mathews | 56—24 |

FOREIGN PATENTS

| 1,136,155 | 9/1962 | Germany. |
| 841,395 | 7/1960 | Great Britain. |
| 102,349 | 8/1963 | Norway. |

ABRAHAM G. STONE, *Primary Examiner.*

RUSSELL R. KINSEY, M. C. PAYDEN,,
*Assistant Examiners.*